United States Patent
Lesesky et al.

(10) Patent No.: US 11,420,488 B1
(45) Date of Patent: *Aug. 23, 2022

(54) TIRE SENSOR MOUNTING ASSEMBLY, VEHICLE WHEEL BALANCER, COMBINATION TIRE SENSOR MOUNTING ASSEMBLY AND WHEEL BALANCER, METHOD FOR MOUNTING A TIRE SENSOR TO A VEHICLE PART, AND METHOD FOR BALANCING A VEHICLE WHEEL

(71) Applicant: ITIRE, LLC, Rock Hill, SC (US)

(72) Inventors: Alan C. Lesesky, Charlotte, NC (US); Samuel Duke Drinkard, Gaston, SC (US); Ryan D. Parks, Rock Hill, SC (US)

(73) Assignee: ITIRE, LLC, Rock Hill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/443,605

(22) Filed: Jul. 27, 2021

Related U.S. Application Data

(63) Continuation of application No. 16/526,345, filed on Jul. 30, 2019, now Pat. No. 11,072,213, which is a continuation of application No. 15/519,727, filed as application No. PCT/US2015/056213 on Oct. 19, 2015, now Pat. No. 10,363,783.

(60) Provisional application No. 62/173,698, filed on Jun. 10, 2015, provisional application No. 62/115,370, filed on Feb. 12, 2015, provisional application No. 62/122,329, filed on Oct. 17, 2014.

(51) Int. Cl.
*B60C 23/04* (2006.01)
*F16F 15/36* (2006.01)
*F16F 15/32* (2006.01)

(52) U.S. Cl.
CPC ...... *B60C 23/0498* (2013.01); *B60C 23/0493* (2013.01); *F16F 15/324* (2013.01); *F16F 15/363* (2013.01); *F16F 2230/08* (2013.01)

(58) Field of Classification Search
CPC ............ B60C 23/0498; B60C 23/0493; F16F 15/324; F16F 15/363
See application file for complete search history.

(56) References Cited

U.S. PATENT DOCUMENTS

| | | | | |
|---|---|---|---|---|
| 3,346,303 | A | 10/1967 | Wesley | |
| 6,267,450 | B1 * | 7/2001 | Gamble | B60B 21/00 301/5.22 |
| 6,885,291 | B1 * | 4/2005 | Pollack | B60C 23/0433 116/34 R |
| 10,363,783 | B2 * | 7/2019 | Lesesky | F16F 15/324 |
| 11,072,213 | B2 * | 7/2021 | Lesesky | F16F 15/324 |
| 2003/0025382 | A1 * | 2/2003 | Johnson | F16F 15/366 301/53.5 |

(Continued)

OTHER PUBLICATIONS

"Geotab Launches First Telematics NFC ID Key Solution" www.geotab.com/press-release/nfc-drive-id/; Jul. 15, 2013.

*Primary Examiner* — Jason R Bellinger
(74) *Attorney, Agent, or Firm* — Schwartz Law Firm, P.C.

(57) ABSTRACT

An in-tire vehicle tire sensor assembly is adapted for residing inside a pneumatic tire mounted on a wheel rim of a motor vehicle. A flexible mounting cable is secured to the sensor assembly, and adapted for extending circumferentially within an annular space formed between the tire and wheel rim. A counterweight is secured to the mounting cable a spaced distance from the sensor assembly.

18 Claims, 15 Drawing Sheets

(56) References Cited

U.S. PATENT DOCUMENTS

2016/0311275 A1* 10/2016 Uh .................... B60C 23/04985
2018/0056736 A1* 3/2018 Yu .................... B60C 23/04985

* cited by examiner

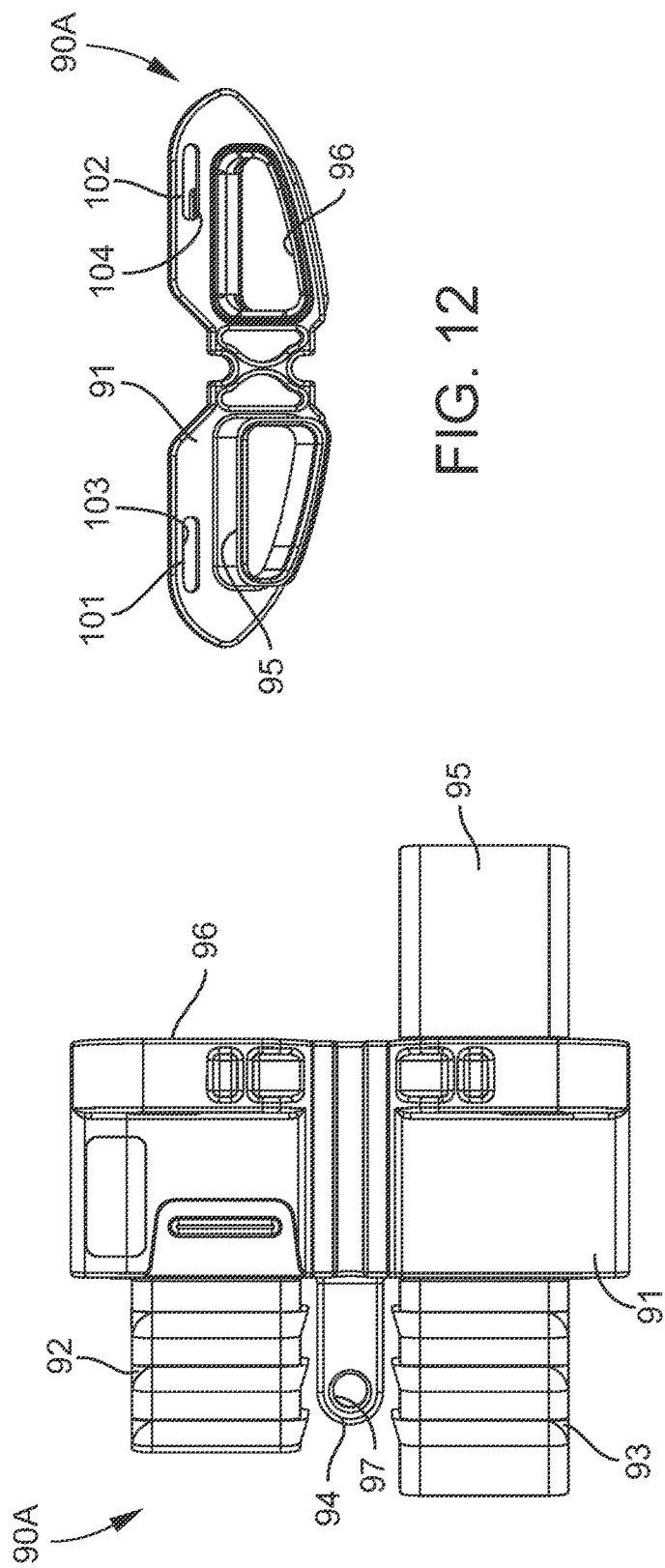
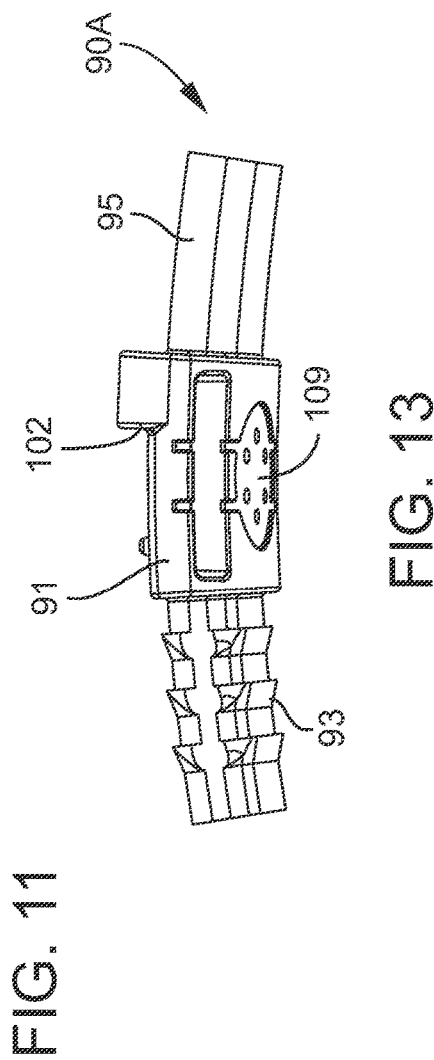
FIG. 11
FIG. 12
FIG. 13

TIRE SENSOR MOUNTING ASSEMBLY, VEHICLE WHEEL BALANCER, COMBINATION TIRE SENSOR MOUNTING ASSEMBLY AND WHEEL BALANCER, METHOD FOR MOUNTING A TIRE SENSOR TO A VEHICLE PART, AND METHOD FOR BALANCING A VEHICLE WHEEL

TECHNICAL FIELD AND BACKGROUND OF THE DISCLOSURE

The present disclosure relates broadly and generally to a tire sensor mounting assembly, vehicle wheel balancer, combination tire sensor mounting assembly and wheel balancer, method for mounting a tire sensor to a vehicle part (e.g., wheel rim or tire), and method for balancing a vehicle wheel.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a combination vehicle tire sensor assembly and in-tire wheel balancer. The exemplary combination is adapted for residing inside a pneumatic tire mounted on a wheel rim of a motor vehicle. The combination comprises a flexible mounting cable secured to the sensor assembly, and adapted for extending circumferentially within an annular space formed between the tire and wheel rim. A counterweight is secured to the mounting cable inside the pneumatic tire a spaced distance from the sensor assembly. A substantially hollow vented balancer belt resides inside the pneumatic tire adjacent the sensor assembly and counterweight, and defines a circumferentially-extending exterior groove designed for receiving and locating said mounting cable, and a circumferentially-extending interior cavity adapted for loosely containing a wheel-balancing medium.

The term "mounting cable" is broadly defined herein and intended to cover equivalent structure and elements including flat metal bands, metal and non-metal rope, strap, wire, and the like.

According to another exemplary embodiment, the tire sensor assembly comprises a tire pressure monitoring system (TPMS). This and other exemplary in-tire sensor assemblies may function to monitor battery voltage, air pressure, temperature, vibration, accumulated tire revolutions, and other internal conditions of the wheel/tire environment.

In one implementation, the in-tire sensor assembly is designed to measure accumulated tire revolutions and determined tire conditions, such as tread wear (or thickness) and/or proper inflation, based on mathematical calculations. For example, the present sensor assembly may cooperate with vehicle GPS technology to determine that a new tire yields 500 revolutions per mile. As the tire tread begins to wear, the revolutions per mile increases. When a predetermined threshold is reached (e.g., 600 rev/mi), the sensor assembly may electronically transmit an alert to the driver, EOR, and/or remote terminal indicating a potential hazardous tire condition. An under-inflated tire will also yield a greater number of revolutions per mile, and in this event a similar alert may be transmitted to the driver, EOR, and/or remote terminal. For dual-tire arrangements, the present exemplary sensor assembly may be cable-mounted in each tire (as described herein) to monitor air pressure based on revolutions per mile, and to transmit an alert in the event a revolutions-per-mile differential (e.g., 50 rev/mi) exceeds a predetermined threshold. This differential would indicate potential under-inflation of one of the two adjacent tires—a condition which may cause scrubbing and damage to both tires. In such dual-tire arrangements, ideally both tires should be equally inflated (or at least within 5 psi).

According to another exemplary embodiment, the wheel-balancing medium comprises steel shot.

According to another exemplary embodiment, the interior cavity of the balancer belt is radially divided into separate cavity sections.

According to another exemplary embodiment, the exterior cable groove of the balancer belt is formed between the radially-divided cavity sections.

According to another exemplary embodiment, at least one belt coupler operatively joins first and second open ends of the balancer belt. The belt coupler may be integrally-formed of a molded heat-resistant plastic or other durable material.

According to another exemplary embodiment, the belt coupler comprises a hollow body fluidly communicating with the hollow balancer belt and defining a perforated airway adapted for allowing equalization of air pressure air inside the hollow balancer belt and tire. The term "fluidly communicating" means allowing the free transfer of air between and through the belt coupler and balancer belt, thereby preventing the belt from collapsing inside the tire.

According to another exemplary embodiment, an air-permeable filter (e.g., CORTEX) covers the perforated airway formed with the hollow body of the belt coupler to allow pressure equalization without moisture entry.

According to another exemplary embodiment, the belt coupler further comprises first and second open-end serrated legs extending from the hollow body and inserting into respective cavity sections of the balancer belt.

According to another exemplary embodiment, the belt coupler further comprises an elongated proximal fastener tongue extending from the hollow body between the first and second serrated legs, and inserting into an intermediate cavity section of the balancer belt. The fastener tongue defines a fastener hole designed to receive a press-in fastener inserted through the balancer belt.

According to another exemplary embodiment, the belt coupler further comprises distal male and female connecting ends adapted for mating with complementary ends of an adjacent belt coupler.

According to another exemplary embodiment, the belt coupler further comprises first and second fastener anchors formed adjacent respective male and female connecting ends, and defining respective openings for receiving flexible tie-wraps adapted for attaching the belt coupler to a complementary adjacent belt coupler.

In another exemplary embodiment, the present disclosure comprises an in-tire wheel balancer adapted for residing inside a pneumatic tire mounted on a wheel rim of a motor vehicle. The wheel balancer comprises a substantially hollow balancer belt adapted for extending circumferentially within an annular space formed between the tire and wheel rim. The balancer belt has first and second open ends, and defines a circumferentially-extending interior cavity between its first and second ends for loosely containing a wheel-balancing medium. At least one substantially hollow belt coupler operatively joins the first and second open ends of the balancer belt, and comprises a hollow body fluidly communicating with the hollow balancer belt and defining a perforated airway adapted for allowing equalization of air pressure air inside the hollow balancer belt and tire.

According to another exemplary embodiment, the wheel-balancing medium comprises steel shot or other loose weighted media.

According to another exemplary embodiment, the interior cavity of the balancer belt is radially divided into separate cavity sections.

According to another exemplary embodiment, the belt coupler further comprises first and second open-end serrated legs extending from the hollow body and inserting into respective cavity sections of the balancer belt.

According to another exemplary embodiment, the belt coupler further comprises an elongated proximal fastener tongue extending from the hollow body between the first and second serrated legs, and inserting into an intermediate cavity section of the balancer belt. The fastener tongue defines a fastener hole designed to receive a press-in fastener inserted through the balancer belt.

According to another exemplary embodiment, the belt coupler further comprises distal male and female connecting ends adapted for mating with complementary ends of an adjacent belt coupler.

According to another exemplary embodiment, the belt coupler further comprises first and second fastener anchors formed adjacent respective male and female connecting ends, and defining respective openings for receiving flexible tie-wraps adapted for attaching the belt coupler to a complementary adjacent belt coupler.

According to another exemplary embodiment, an air-permeable filter covers the perforated airway formed with the hollow body of the belt coupler.

BRIEF DESCRIPTION OF THE DRAWINGS

Exemplary embodiments of the present disclosure will hereinafter be described in conjunction with the following drawing figures, wherein like numerals denote like elements, and wherein:

FIG. 11 is a top view of one exemplary belt coupler;

FIG. 12 is an end view of the exemplary belt coupler;

FIG. 13 is a side view of the exemplary belt coupler;

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
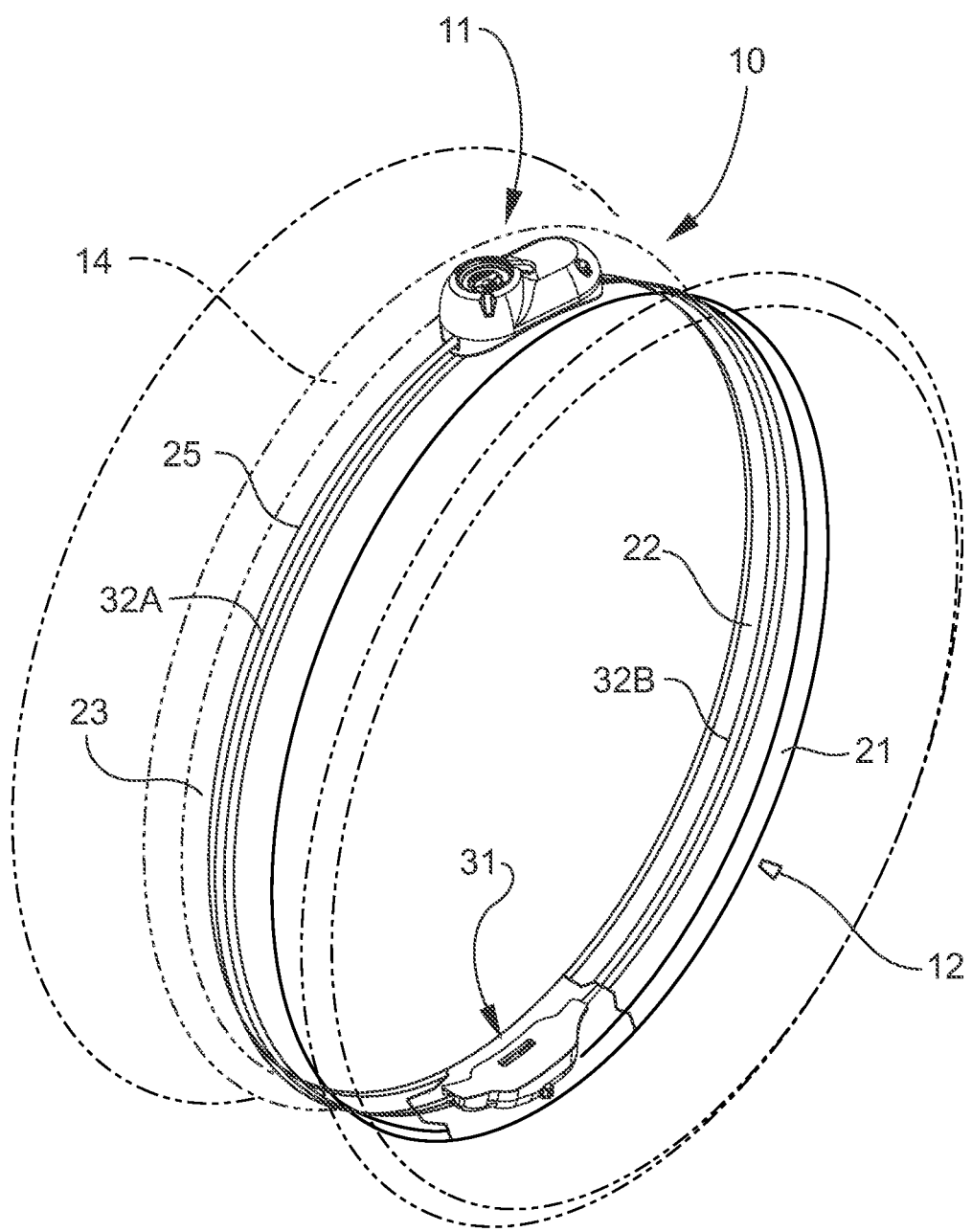
FIG. 1 is an environmental perspective view of a combination vehicle tire sensor assembly and wheel balancer according to one exemplary embodiment of the present disclosure.
Figure 2:
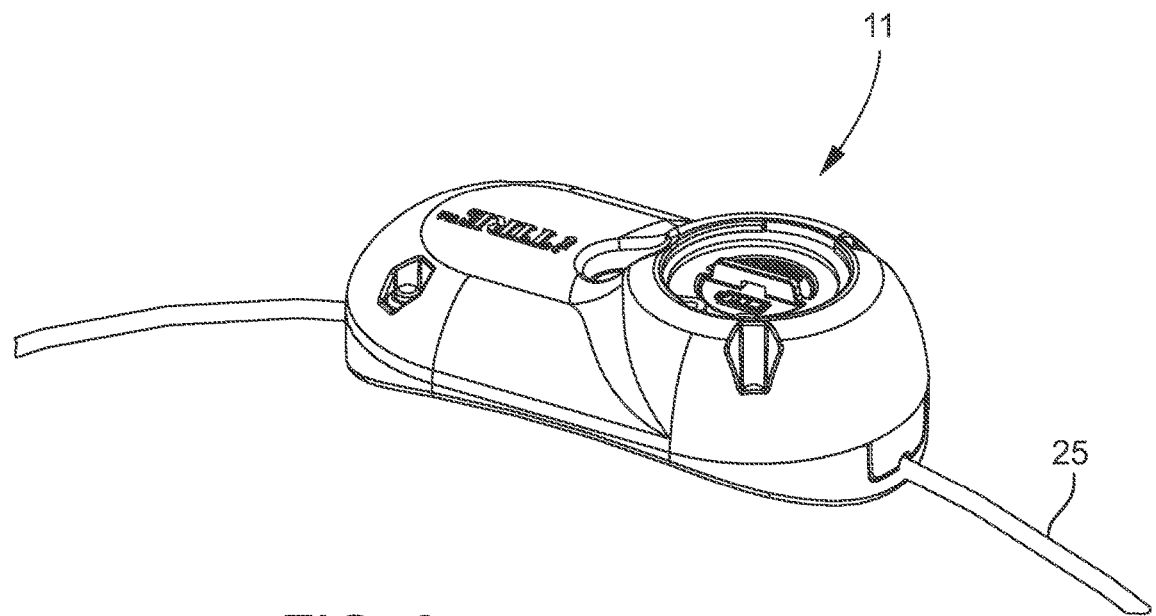
FIG. 2 is a perspective view of the exemplary cable-mounted sensor assembly (TPMS)
Figure 3:
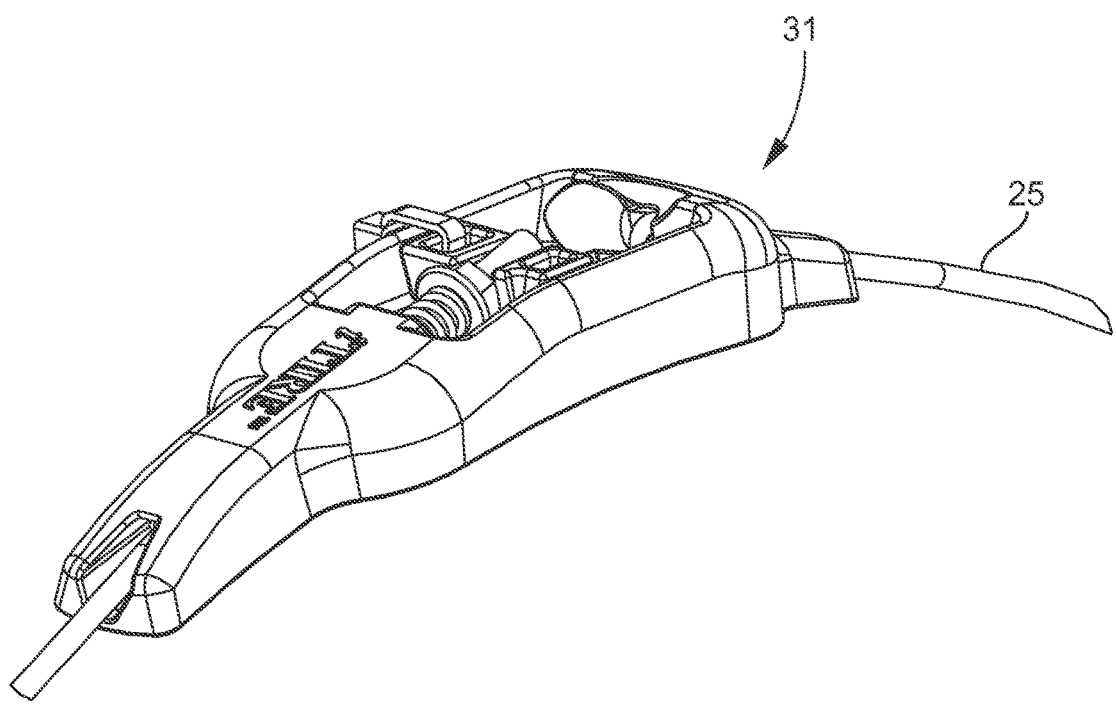
FIG. 3 is a perspective view of the exemplary cable-mounted counterweight.

Referring now specifically to the drawings, a combination vehicle tire sensor assembly and in-tire wheel balancer according to one exemplary embodiment is illustrated in FIG. 1, and shown generally at reference numeral 10. The present disclosure comprises a vehicle tire sensor assembly 11, such as tire pressure monitoring system (TPMS), and an in-tire wheel balancer 12—both residing in combination inside a pneumatic tire (not shown) mounted on the wheel rim 14 of a motor vehicle. The exemplary TPMS 11 and wheel balancer 12 may be used independent of one another, and in combination with alternative in-tire vehicle sensor assemblies and wheel balancers. In further exemplary applications, the present disclosure comprises a method for mounting a vehicle sensor assembly 11, such as a TPMS, to a vehicle part (e.g., wheel or tire), and a method for balancing a vehicle wheel.

Referring to FIGS. 1-5 and 10, when used in combination the present TPMS 11 and in-tire wheel balancer 12 are located adjacent the vehicle wheel rim 14 within an annular pressurized space formed between the tire and rim 14. The wheel balancer 12 comprises a substantially hollow balancer belt 21 which extends 360 degrees around the rim 14, and has a generally convex rim-side surface 22 which resides closely adjacent (e.g., directly contacting) a metal surface of the drop center region. The TPMS 11 resides directly adjacent a generally flat tire-side surface 23 of the balancer belt 21, and is carried on a flexible steel mounting cable 25 which adjustably connects at its opposite ends to a counterweight 31, described further below. The counterweight 31 is spaced 180-degrees from the TPMS 11, and likewise resides directly adjacent the tire-side surface 23 of the balancer belt 21. In the exemplary embodiment, the balancer belt 21 defines annular tire-side and rim-side grooves 32A, 32B. In steel rim wheels, the tire-side groove 32A is designed to centrally locate and retain the flexible mounting cable 25. The mounting cable 25 not only functions to carry the TPMS 11 and counterweight 31 inside the vehicle tire, but may also further secure the wheel balancer 12 to the rim 14. The cable 25 may be coated or shrouded with a flexible durable material, such as nylon, to protect against fraying or other incidental damage.

Exemplary TPMS 11

Figure 6:
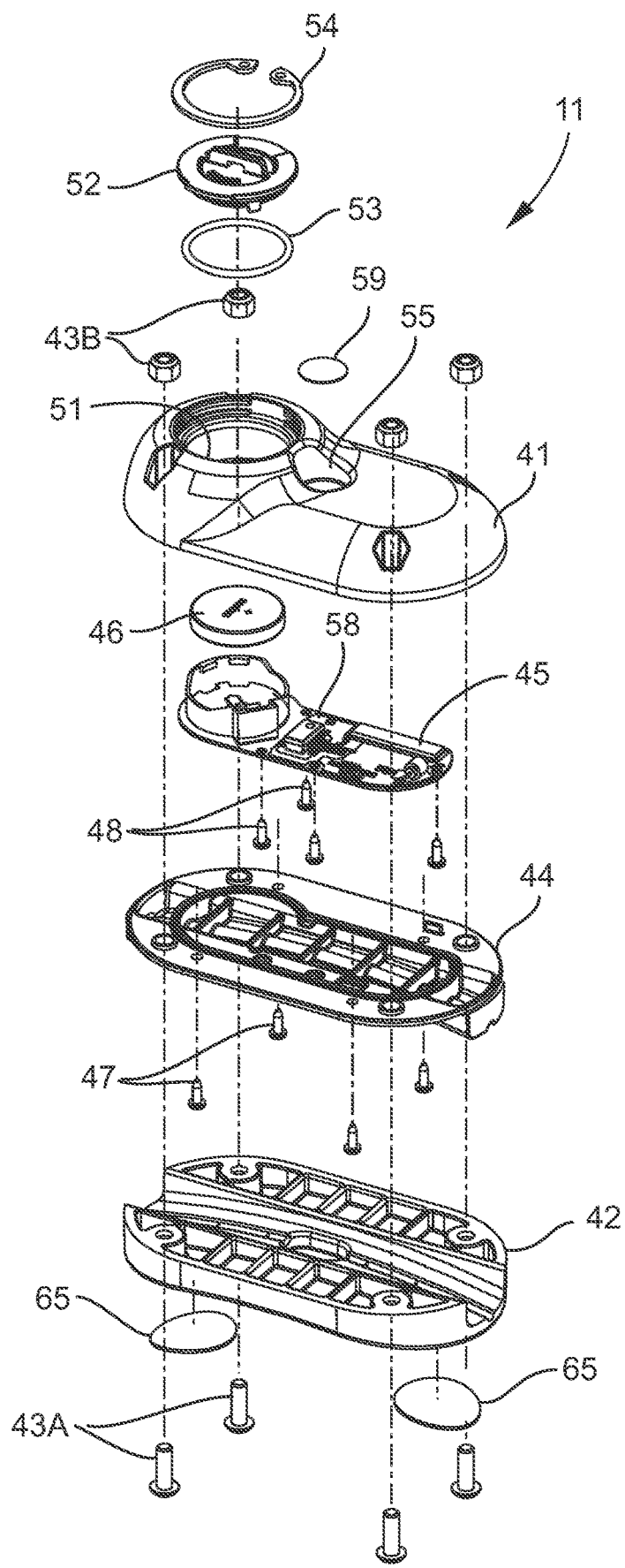
FIG. 6 is an exploded perspective view of the exemplary cable-mounted TPMS.
Figure 7:
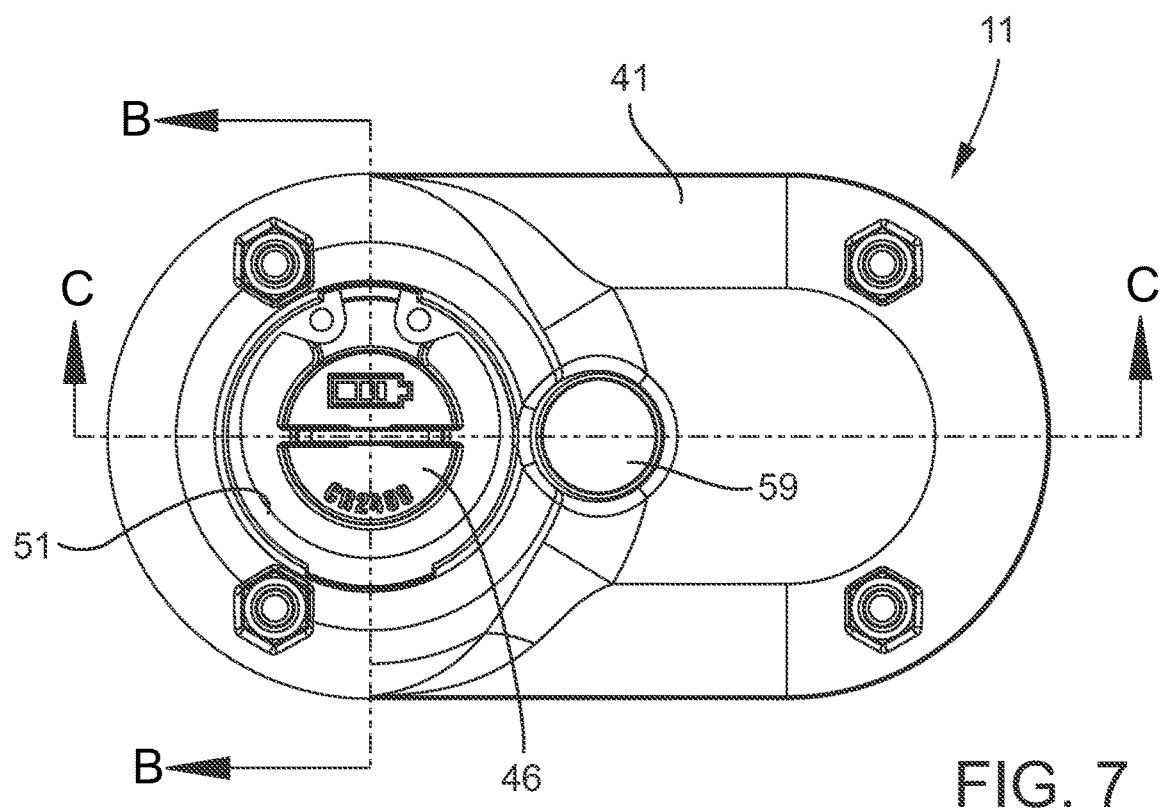
FIG. 7 is a top view of the exemplary TPMS.
Figure 8:
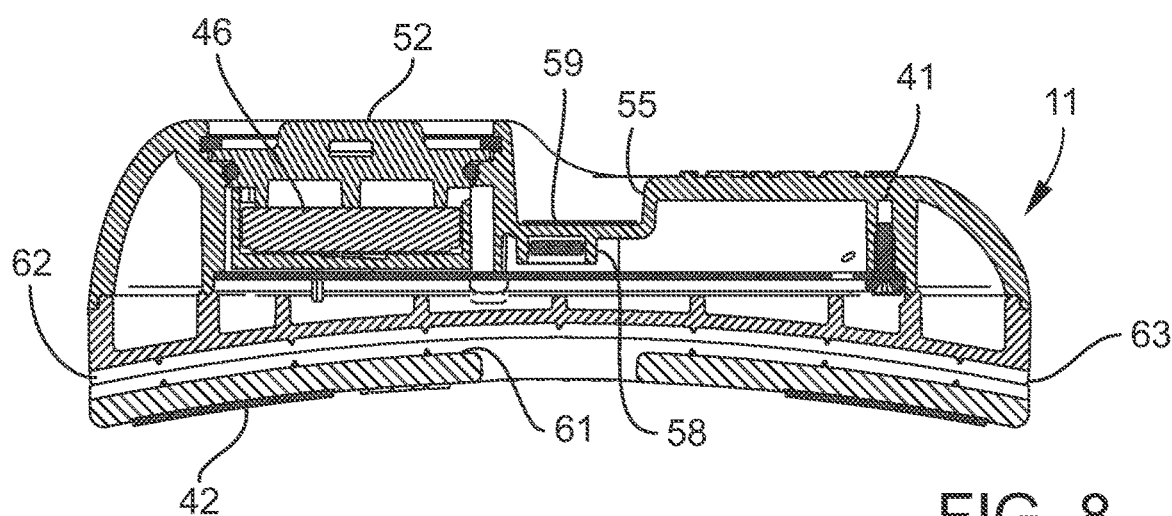
FIG. 8 is a cross-sectional view of the TPMS taken substantially along line C-C of FIG. 7.
Figure 9:
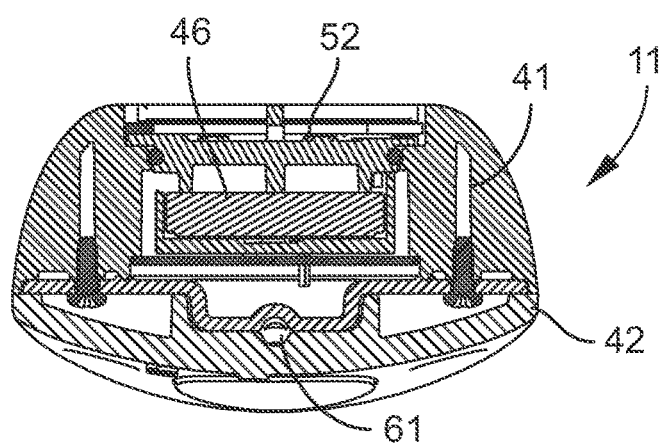
FIG. 9 is a cross-sectional view of the counterweight taken substantially along line B-B of FIG. 7.

Referring to FIGS. 1, 2 and 6-9, the exemplary TPMS 11 comprises a substantially hollow sensor housing 41 and cable plate 42 joined together by hardware 43A, 43B (e.g., threaded screws and nuts), and designed for containing internal components of the sensor assembly; namely, the sensor plate 44, PBC assembly 45, and replaceable battery 46. The exemplary battery 46 may comprise a rechargeable lithium 3V coin cell battery. The sensor plate 44 and PCB assembly 45 are joined to the sensor housing 41 by hardware 47 and 48, respectively. As best shown in FIGS. 6, 8 and 9, the sensor housing 41 defines a cylindrical battery cavity 51 designed for receiving, holding and protecting the battery 46. A threaded battery cap 52 and O-ring 53 cover and seal a top opening of the battery cavity 51. The threaded battery cap 52 may be further secured by a metal retaining ring 54 seated within an internal annular groove formed at a mouth of the battery cavity 51. The battery 46 may be readily removed from the cavity 51 and replaced using a magnet or other suitable tool.

A sensor opening 55 is formed with the housing 41 adjacent the battery cavity 51, and communicates with a sensor chip 58 mounted on the PCB assembly 45. The sensor opening 55 may be covered and protected by a replaceable air-permeable air filter 59, and the sensor chip 58 surrounded by an O-ring (not shown). The air filter 59 may be fabricated of a porous PFTE or other suitable material. The filter 59 allows air inside the tire to freely pass through the sensor opening 55 to the sensor chip 58, while blocking the entry of contaminants which may damage the chip or other components of the PCB assembly 45. A combination of rubber O-rings, filters, ultrasonic welding, a potting process, and/or other measures may be utilized to effectively seal and protect all components of PCB assembly 45 from the surrounding environment inside the vehicle tire.

Referring to FIGS. 1, 8 and 9, facing surfaces of the cable plate 42 and sensor plate 44 inside the TPMS 11 cooperate to define an internal longitudinal cable passage 61 adapted for receiving the mounting cable 25 through the TPMS 11. The exit openings 62 and 63 of the cable passage 61 are formed closely adjacent the metal rim 14, thereby minimizing gaps between the cable 25 and rim surface. The TPMS 11 may be further secured to the balancer belt 21 using one or more adhesive (PSA) pads 65, and projecting structure designed to sit within the cable groove 32A to prevent inadvertent shifting or rotation.

The exemplary TPMS 11 may function to measure tire air pressure and one or more of air temperature within the tire, tire temperature, vibration, tire/wheel revolutions, and other internal conditions of the wheel/tire environment. In heavy duty tractor-trailer trucks, passenger vehicles, and other motor vehicles, each wheel of the vehicle may incorporate the present exemplary TPMS or TPMS/wheel balancer combination. Data measured by the TPMS sensor(s) may be transmitted, recorded, and communicated in a variety of ways. In one example, the TPMS 11 transmits signals (e.g., via existing vehicle databus) to a vehicle receiver which electronically communicates data to the driver through a dashboard display/monitor; and optionally, electronically stores the data in the vehicle's electronic onboard recorder. Alternatively, the vehicle data may be transmitted wirelessly to any suitable handheld computing device configured to wake-up and receive the signal transmission from the TPMS. The data may be recorded directly on the handheld computing device, and/or transmitted wirelessly to a cloud server or other remote terminal. One example of a handheld computing device for collecting, storing and communicating vehicle sensor data is disclosed in Applicant's prior published application WO 2015/138431 (International Application No. PCT/US2015/019675). The complete disclosure of this prior publication is incorporated by reference in the present application.

Exemplary Counterweight 31

Figure 4:
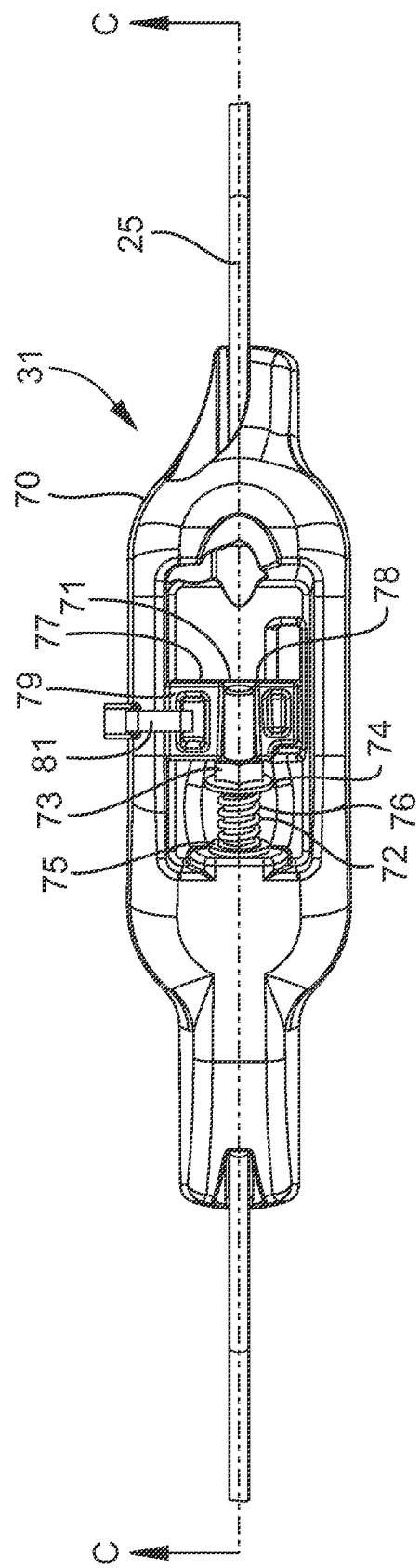
FIG. 4 is a top view of the exemplary counterweight.
Figure 5:
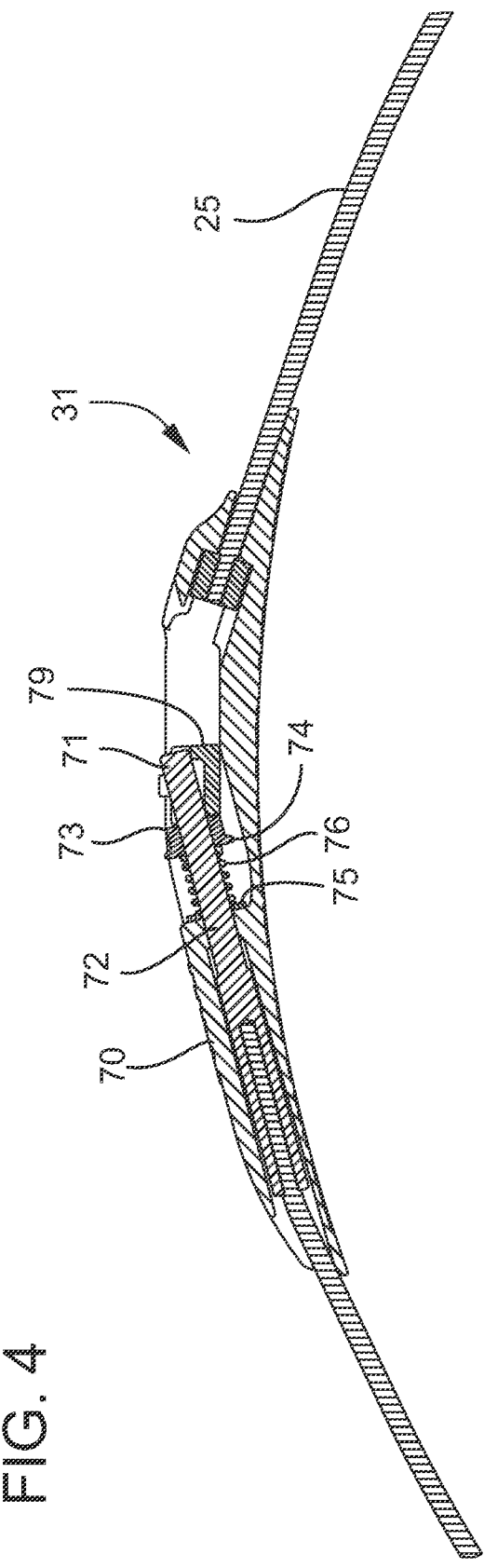
FIG. 5 is a cross-sectional view of the counterweight taken substantially along line C-C of FIG. 4.

Referring to FIGS. 1, 3, 4, and 5, the exemplary counterweight 31 is spaced 180-degrees from the TPMS 11, and functions to adjustably join together free ends of the flexible cable 25 and to counter the weight imbalance created by the sensor assembly. As best shown in FIGS. 4 and 5, one end of the mounting cable 25 extends through and is affixed to a first end of the counterweight body 70, while the opposite cable end extends through a second end of the body and comprises a swaged steel extension 71, threaded stud 72, complementary-threaded nut 73, spaced washers 74 and 75, and a coil spring 76. The steel extension 71 is captured between opposing internal walls 77 and 78 of the counterweight body 70, and is urged towards the first cable end by the coil spring 76 thereby tensioning the mounting cable 25 around the wheel balancer 12 (or alternatively, the wheel rim 14). The relative degree of tension may be controlled by adjusting the position of the threaded nut 73 and washer 74 along a length of the threaded stud 72. Once positioned, the nut 73 may be locked in place by a plastic retaining member 79 designed to align and insert into a slot formed with the counterweight body 70. A heat-resistant tie-wrap 81 may be used to further secure the position of retaining member 79 to prevent rotation of the nut 73 and inadvertent loss of tension in the cable 25. The exemplary spring 76 allows for the disparate expansion coefficients of the different metals (e.g., steel and aluminum) used to fabricate the wheel assembly. In another exemplary application, the TPMS 11 and counterweight 31 can be used as a further balancing element if biased to one side of the in-tire wheel balancer 12. Additionally, adjusting the spacing to other than 180 degrees between the two masses can compensate for a range of imbalances opposite the components.

Exemplary In-Tire Wheel Balancer 12

In one embodiment, the present in-tire wheel balancer 12 is used in combination with the cable-mounted TPMS 11 as described above. In alternative applications, the exemplary wheel balancer 12 is used independent of the cable-mounted TPMS 11 (e.g., where the TPMS mounts directly to the valve stem), or on a vehicle wheel without a TPMS or other sensors. The balancer belt 21 of the wheel balancer 12 is designed to extend 360-degrees around the wheel rim 14, and has a generally convex surface 22 as previously described configured to reside closely adjacent the drop center region of the steel rim 14 and a generally flat surface 23. In aluminum wheels, the balancer belt 21 may be flipped over such that its generally flat surface 23 now resides directly adjacent the substantially flat metal surface of the aluminum rim. In either application, outside marginal edges of the balancer belt 21 may be tapered to fit the particular wheel rim 14 (FIG. 1).

Figure 10:
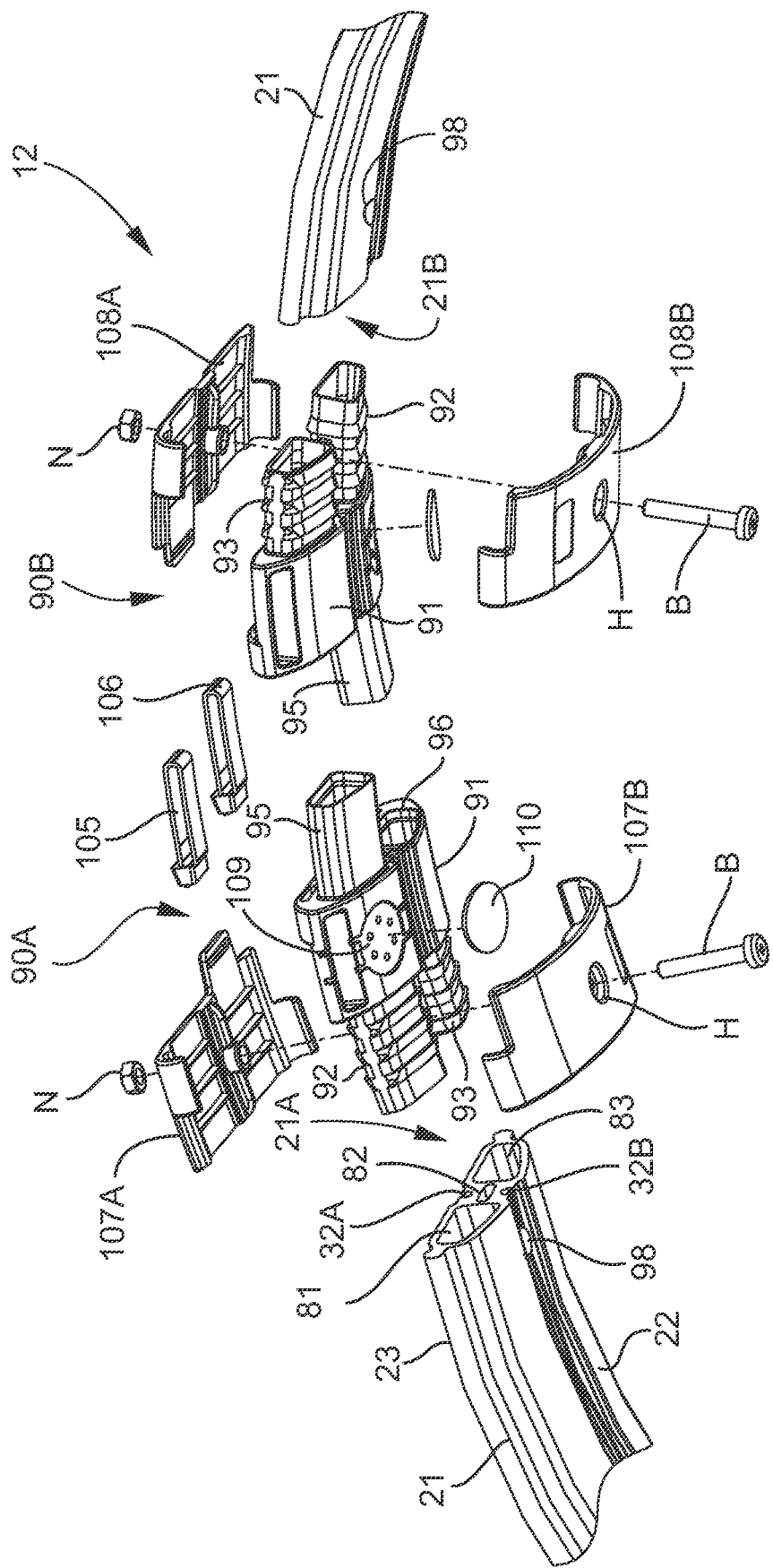
FIG. 10 is an exploded perspective view of exemplary cooperating belt couplers designed for joining open free ends of the balancer belt.

As best shown in FIG. 10, the exemplary balancer belt 21 is radially divided into three separate internal cavity sections 81, 82, 83—a relatively small or narrow center cavity section 82 and two larger outside cavity sections 81 and 83. The cavity sections 81, 83 define respective passages extending entirely from one open end of the belt 21 to other. The exterior cable grooves 32A, 32B are formed directly adjacent (superimposed over) the narrow center cavity section 82 and between the two outside cavity sections 81, 83. Exterior cable grooves 32A, 32B are formed on both sides of the balancer belt 21 to allow flipping and use of the balancer belt 21 on different wheel types, as previously described. Wheel balancing media 85 (FIG. 15), such as steel shot, glass or ceramic beads, or other loose granular matter, are inserted into each of the outside cavity sections 81, 83, and freely travel throughout the cavity sections 81, 83 during rotation of the vehicle wheel. The interior walls of the cavity sections 81, 83 immediately adjacent the tapered marginal edges of the balancer belt 21 may be sufficiently rounded to limit any blocking or obstruction of media flow within the belt 21.

Referring to FIGS. 10-13, after inserting the balancing media 85, first and second (identical but mirrored) belt couplers 90A, 90B function to operatively join together the open ends 21A, 21B of the balancer belt 21 in fluid communication. Each belt coupler 90A, 90B comprises a hollow body 91, first and second hollow open-ended serrated legs 92, 93, an elongated proximal fastener tongue 94 extending between the serrated legs 92, 93, and distal male and female hollow open connecting ends 95, 96. The serrated legs 92, 93 and fastener tongue 94 extend from the hollow body 91, and insert into respective outside cavity sections 81, 83 and center cavity section 82 of the balancer belt 21 at its first open end 21A. The distal male and female connecting ends 95, 96 of the first coupler 90A extend from an opposite end of the hollow body 91, and operatively mate with complementary distal male and female open connecting ends 95, 96 of the second coupler 90B. The open-ended serrated legs 92, 93 and fastener tongue 94 of the second coupler 90B insert into respective outside cavity sections 81, 83 and center cavity section 82 of the balancer belt 21 at its second open end 21B. Additionally, each belt coupler 90A, 90B may comprise a pair of fastener anchors 101, 102 (FIG. 12) formed adjacent respective male and female connecting ends 95, 96, and defining respective openings 103, 104 for receiving flexible heat resistant tie-wraps 105, 106 (FIG. 10) adapted for attaching the two couplers 90A, 90B together. As best shown in FIG. 10, for added reinforcement at respective joined ends 21A, 21B of the balancer belt 21, cooperating belt clamps 107A, 107B and 108A, 108B may be attached at respective belt/coupler joints using complementary threaded bolts "B" and nuts "N". The bolts "B" extend through aligned holes formed with belt clamps 107A,B and 108A, B (at reference "H"), the balancer belt 21 (at reference 98), and fastener tongues 94 (at reference 97), and are adjustable secured and retained by the threaded nuts "N".

Figure 14:
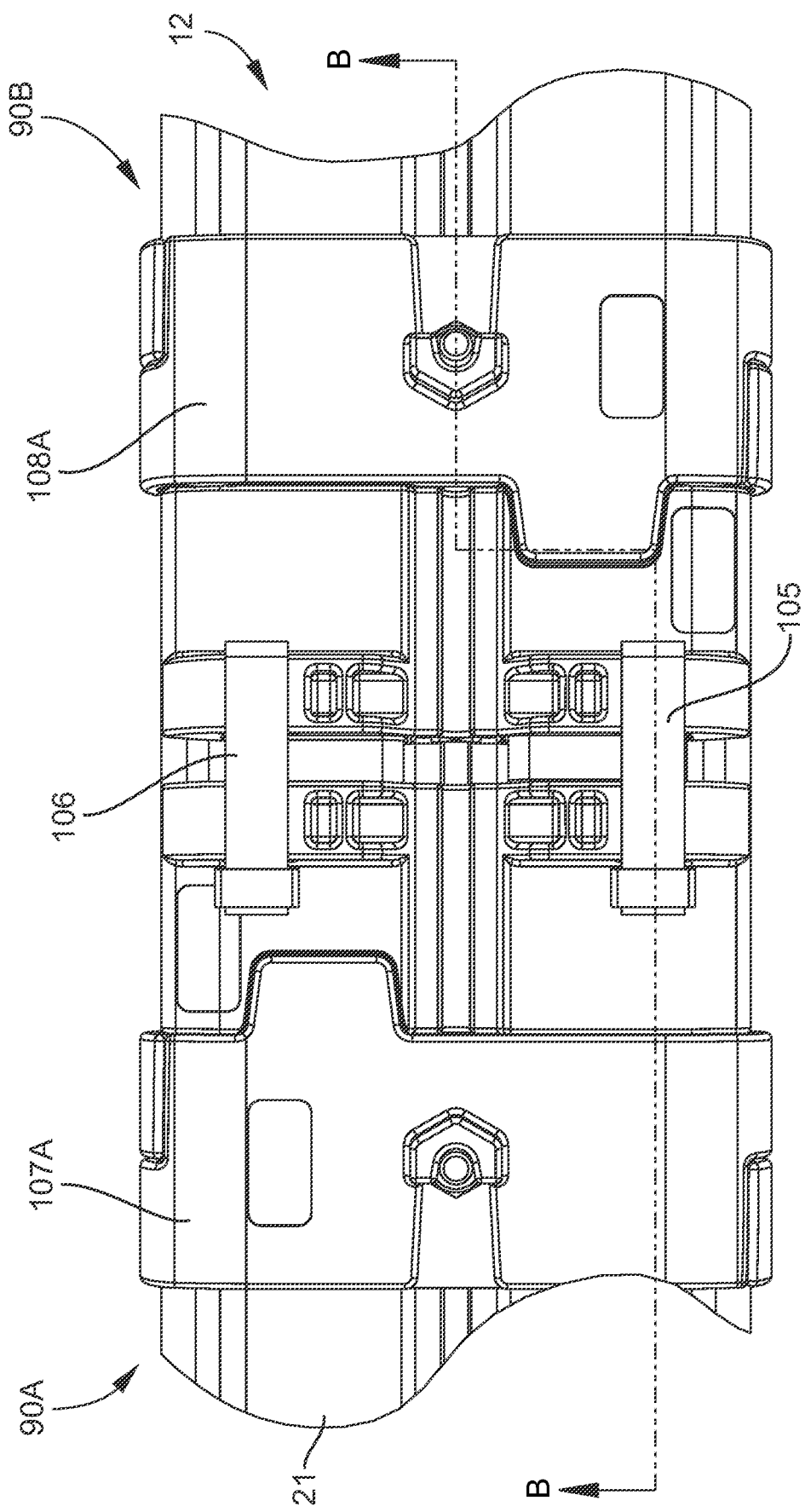
FIG. 14 is a fragmentary plan view of the balancer belt showing the cooperating belt couplers operatively joining its open free ends together.
Figure 15:
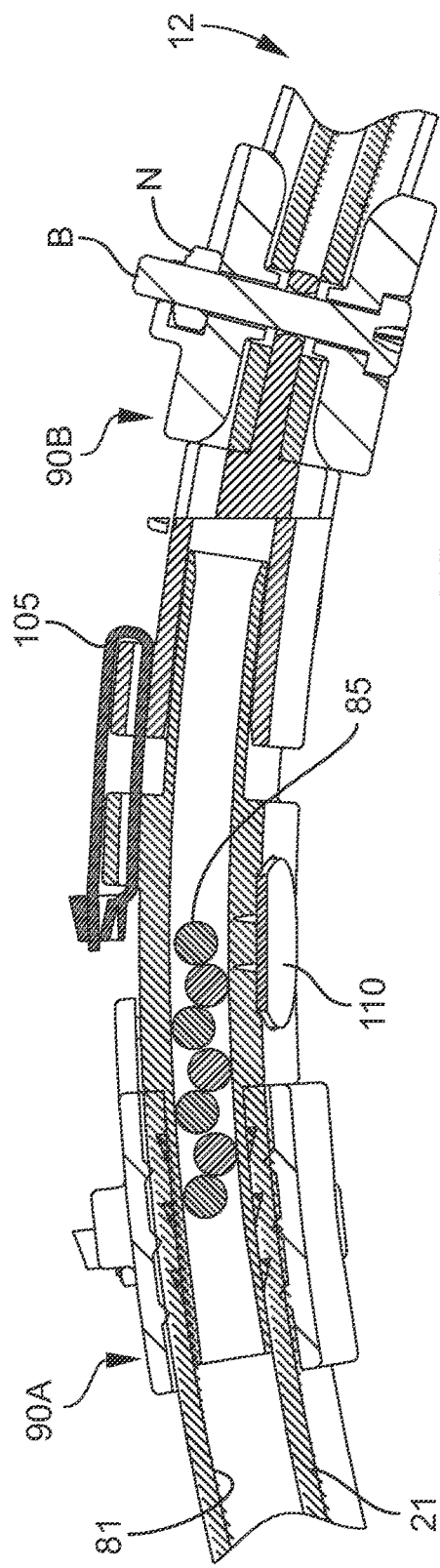
FIG. 15 is a cross-sectional view of the balancer belt taken substantially along line B-B of FIG. 14.
Figure 16:
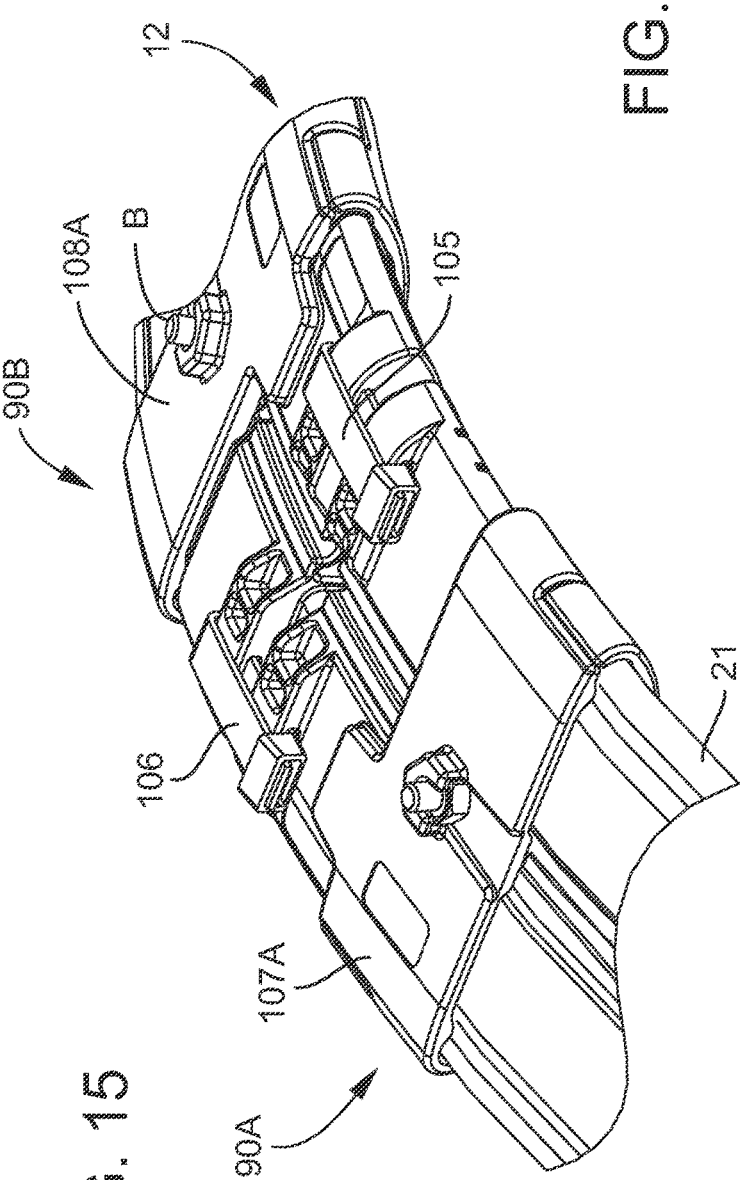
FIG. 16 is a fragmentary perspective of the balancer belt showing the cooperating belt couplers operatively joining its open free ends together.
Figure 17:
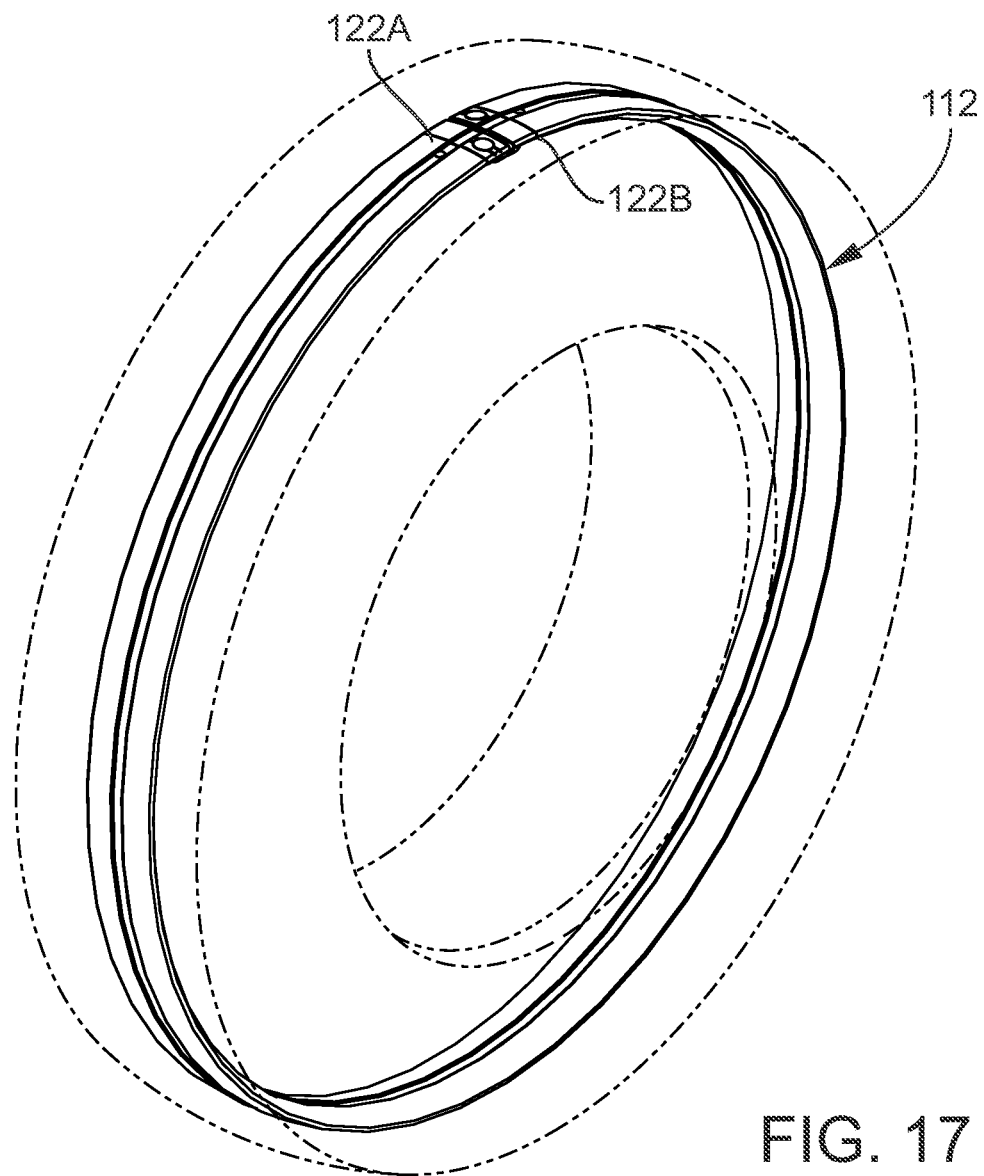
FIGS. 17-20 illustrate an alternative application of the exemplary balancer belt in a pneumatic vehicle tire.
Figure 18:
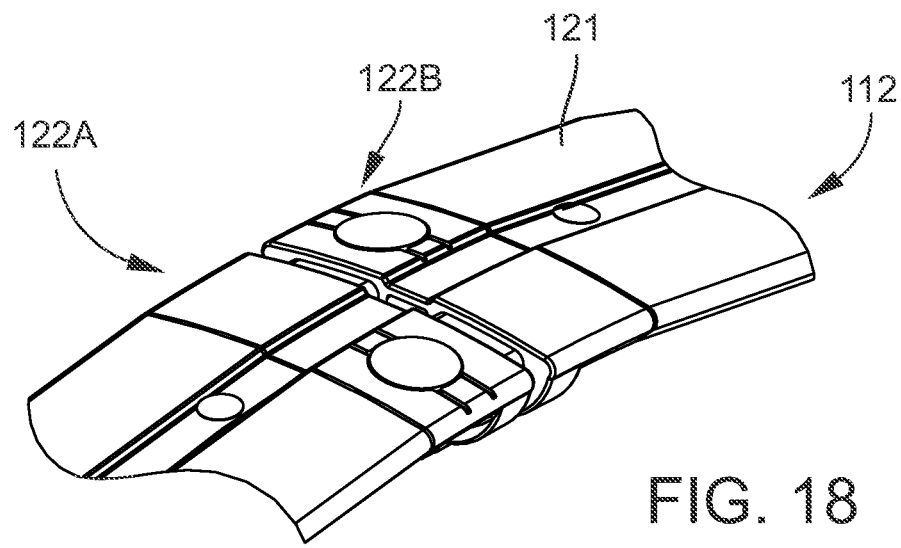
Figure 19:
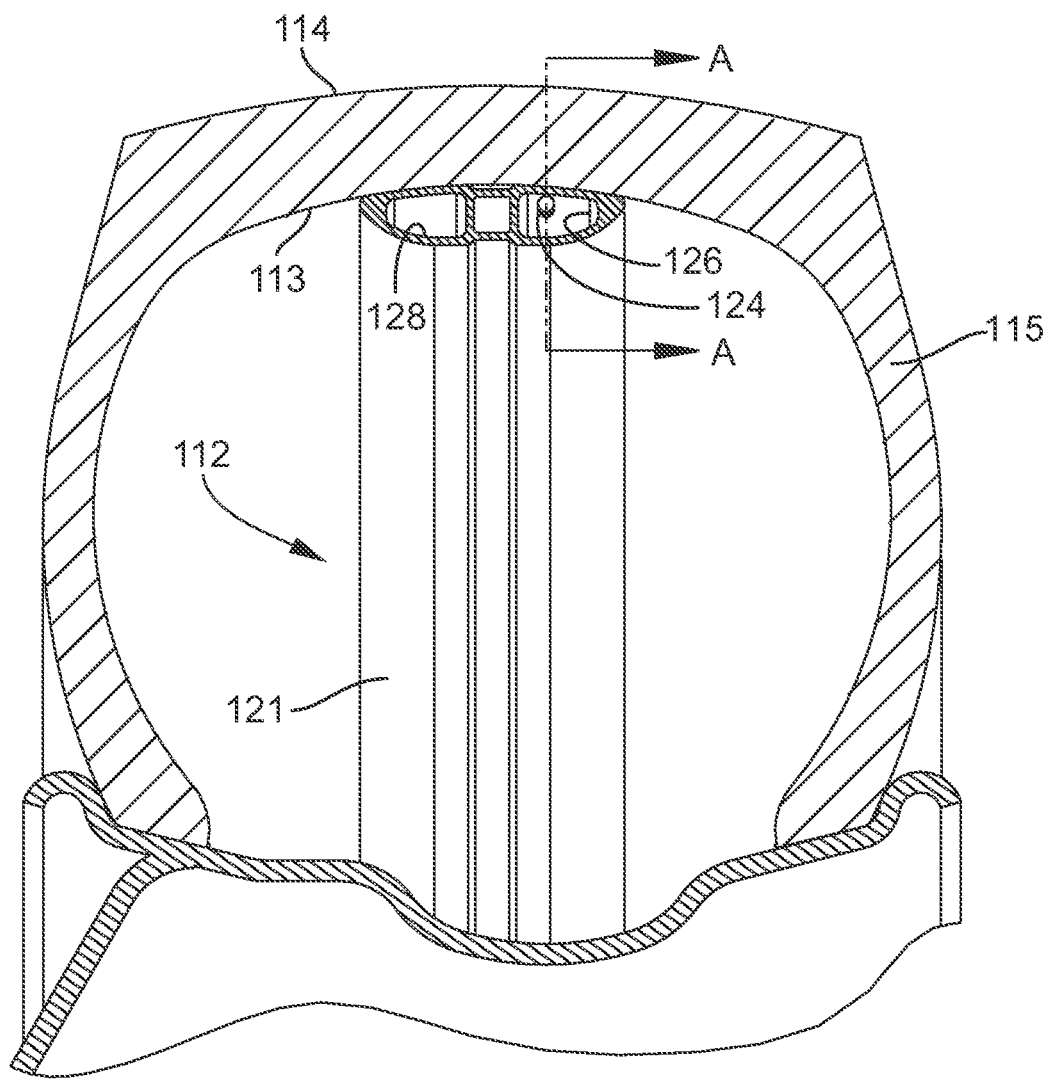
Figure 20:
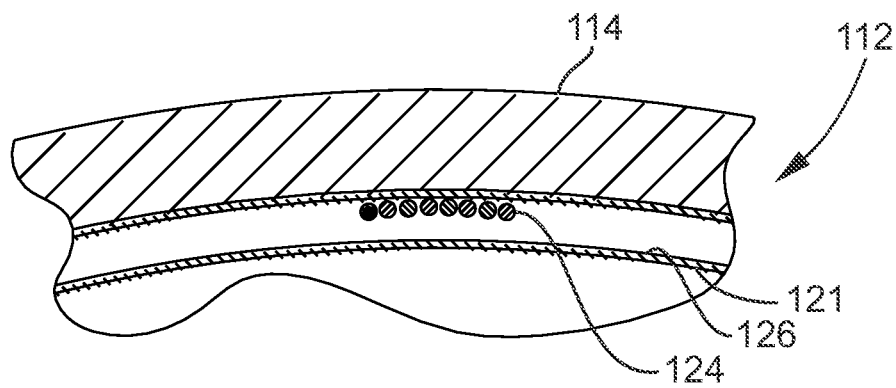

Once assembled as shown in FIGS. 14, 15 and 16, the belt couplers 90A, 90B cooperate with balancer belt 21 to form a closed-looped belt structure (FIG. 1) defining continuous internal cavity sections 81, 83 allowing free 360-degree flow of loose balancing media 85 inside the balancer belt 21. A perforated airway 109 may be formed with the hollow body 91 of each coupler 90A, 90B to allow equalization of air pressure inside the hollow balancer belt 21 and tire. The airway perforations allow a free transfer of air but are sufficiently small to prevent the escape of any wheel balancing media 85. To avoid clogging and the entry of contaminants inside the balancer belt 21, the perforated airway 109 may be covered with a replaceable air-permeable filter 110. The exemplary balancer belt 21 may be fabricated of a durable plastic/rubber material that is sufficiently durable and resilient to spring back from the forces applied to the belt 21 during the tire mounting process without permanently deforming or collapsing the internal cavity sections 81, 82, and 83. A lubricant (solid, spray or liquid) may be applied to the inside walls of the balancer belt 21 to facilitate smooth flow of the balancing media 85 within the cavity sections 81 and 83.

When the vehicle is in motion, the spinning of the wheel causes the distribution of balancing media 85 throughout the balancer belt 21. On a perfectly balanced wheel assembly, the balancing media 85 would be found equally distributed around the outside cavity sections 81, 83 while the vehicle maintained sufficient road speed. In the case of an unbalanced wheel assembly in motion, the balancing media 85 would accumulate toward the under-weighted side, offsetting the difference and substantially balancing the wheel assembly. An improperly balanced wheel assembly creates both additional cost and danger. An unbalanced wheel assembly causes issues such as uneven tread wear, reduced fuel economy, rough vehicle ride, and additional strain on the wheel bearings and suspension due to additional vibration.

Alternative Embodiments of In-Tire Wheel Balancer 112

Figure 21:
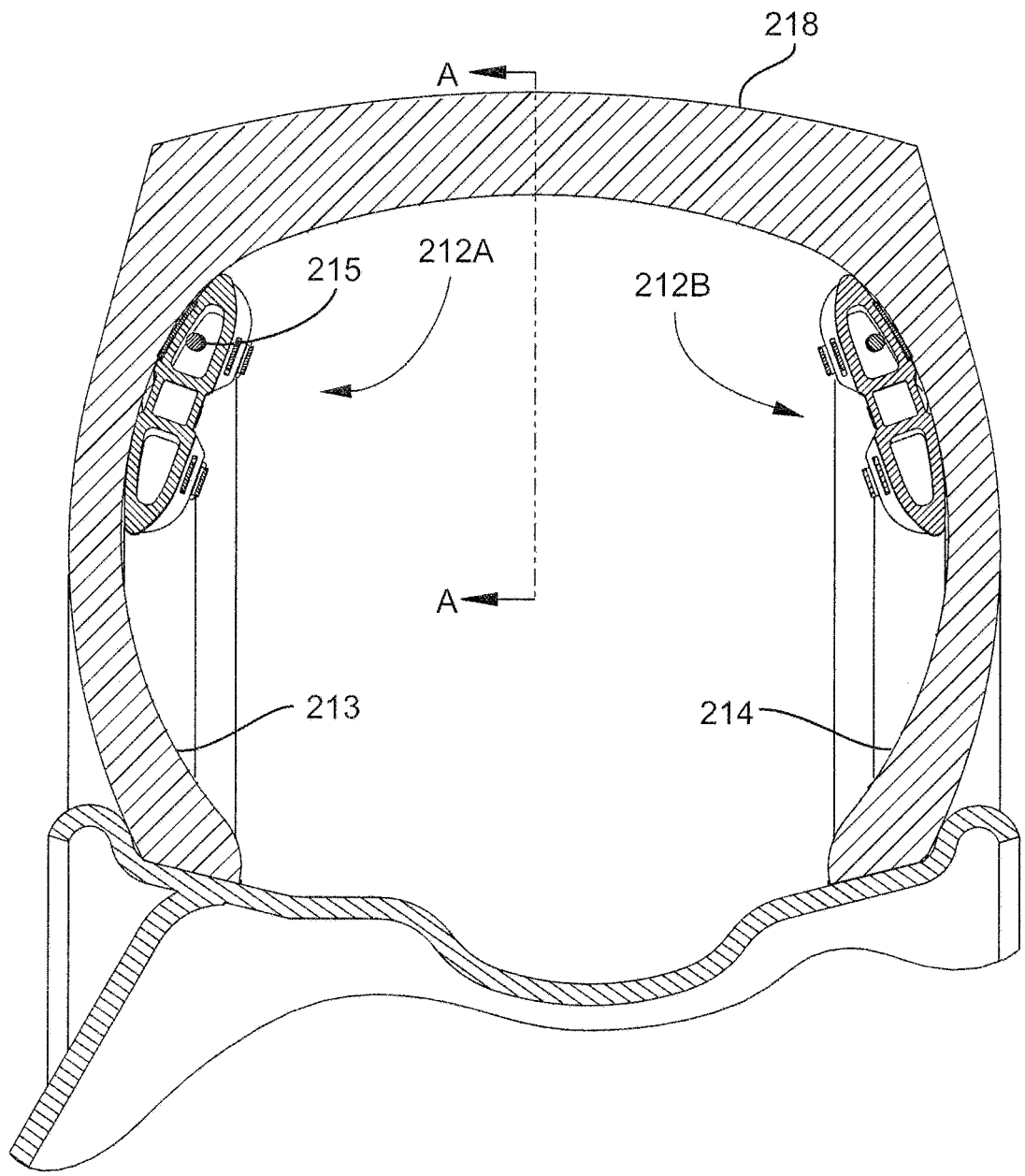
FIG. 21-23 illustrate a further alternative application of exemplary balancer belts in a pneumatic vehicle tire.
Figure 22:
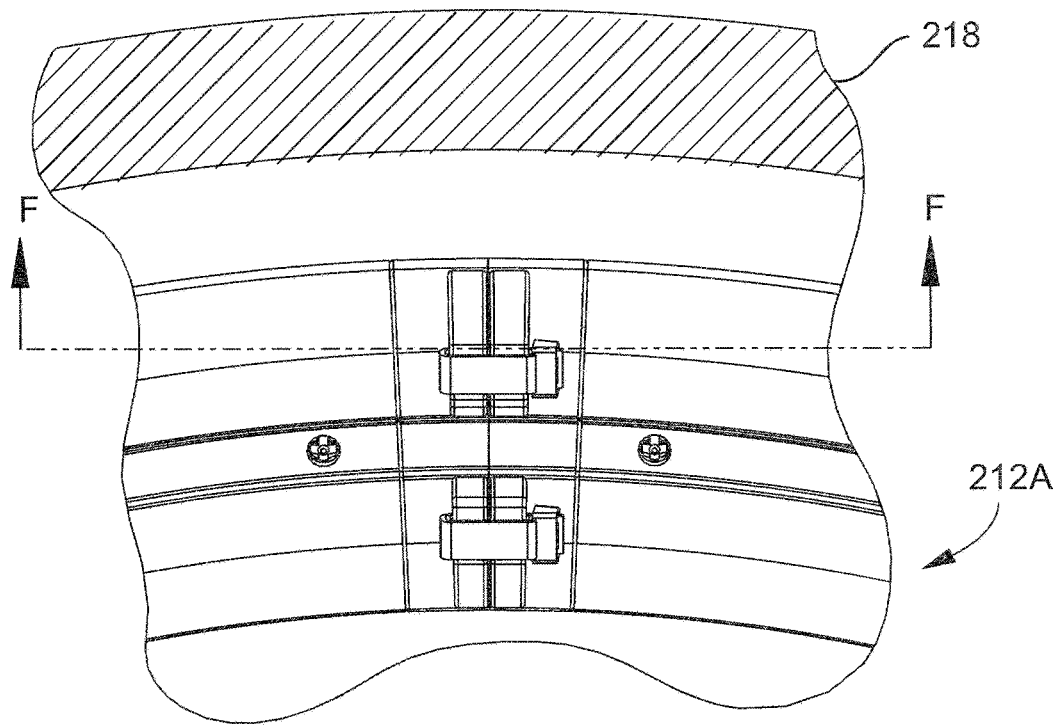
Figure 23:
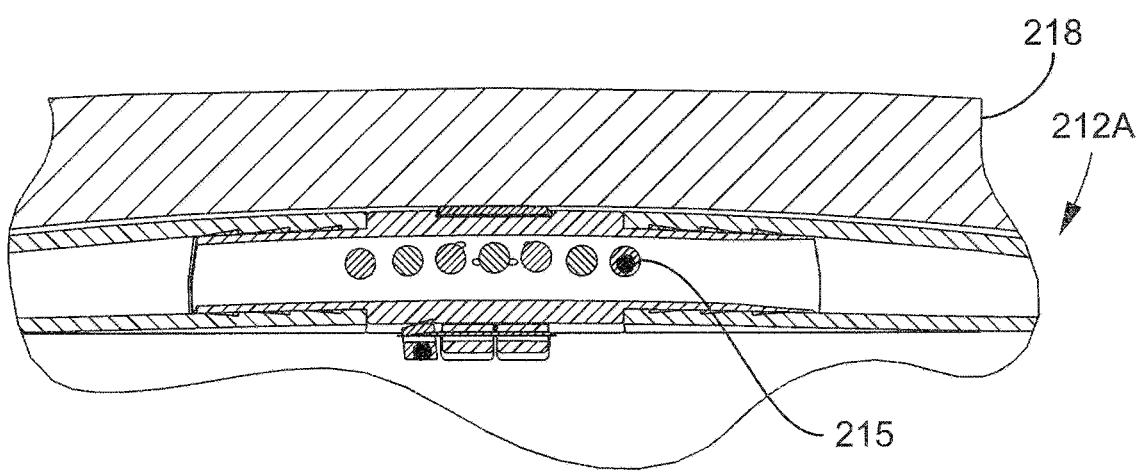

Referring to FIGS. 17-20, in a further alternative embodiment, the exemplary in-tire wheel balancer 112 may be integrally formed (e.g., vulcanized along its entire 360-degree extent) with an inside of the vehicle tire directly adjacent tire surface 113 opposite the tread region 114. Outside of its integral formation with the vehicle tire 115, the construction and features of the wheel balancer 112 are identical to wheel balancer 12 described above. Like the wheel balancer 12, the integrated balancer 112 comprises a multi-cavity hollow balancer belt 121, belt couplers 122A, 122B, and loose wheel balancing media 124 contained within outside cavity sections 126 and 128 of the belt 121. Each belt coupler 122A, 122B defines air holes for allowing internal pressurization. Press-in fasteners and tie-wraps may lock the open ends of the balancer belt 121 together to form a closed-looped belt structure defining continuous internal cavity sections allowing free 360-degree flow of loose balancing media inside the belt 121. The exemplary wheel balancer 112 may be installed opposite the tread region during the tire manufacturing via a vulcanization process (hot or cold), or may be incorporated directly into the molding of the tire itself. In yet another embodiment shown in FIGS. 21-23, one or two wheel balancers 212A, 212B may be mounted on respective interior sidewalls 213, 214 of the vehicle tire 218. The construction and features of wheel balancers 212A, 212B are identical to wheel balancers 112 and 12 previously described. The two sidewall balancers 212A, 212B containing balancing media 215 may be mounted inside the tire 218 in the same manner as the under-tread balancer 112—e.g., during the manufacturing of the tire through a vulcanization process (hot or cold), or by incorporating the wheel balancers directly into the molding of the tire itself.

Figure 24:
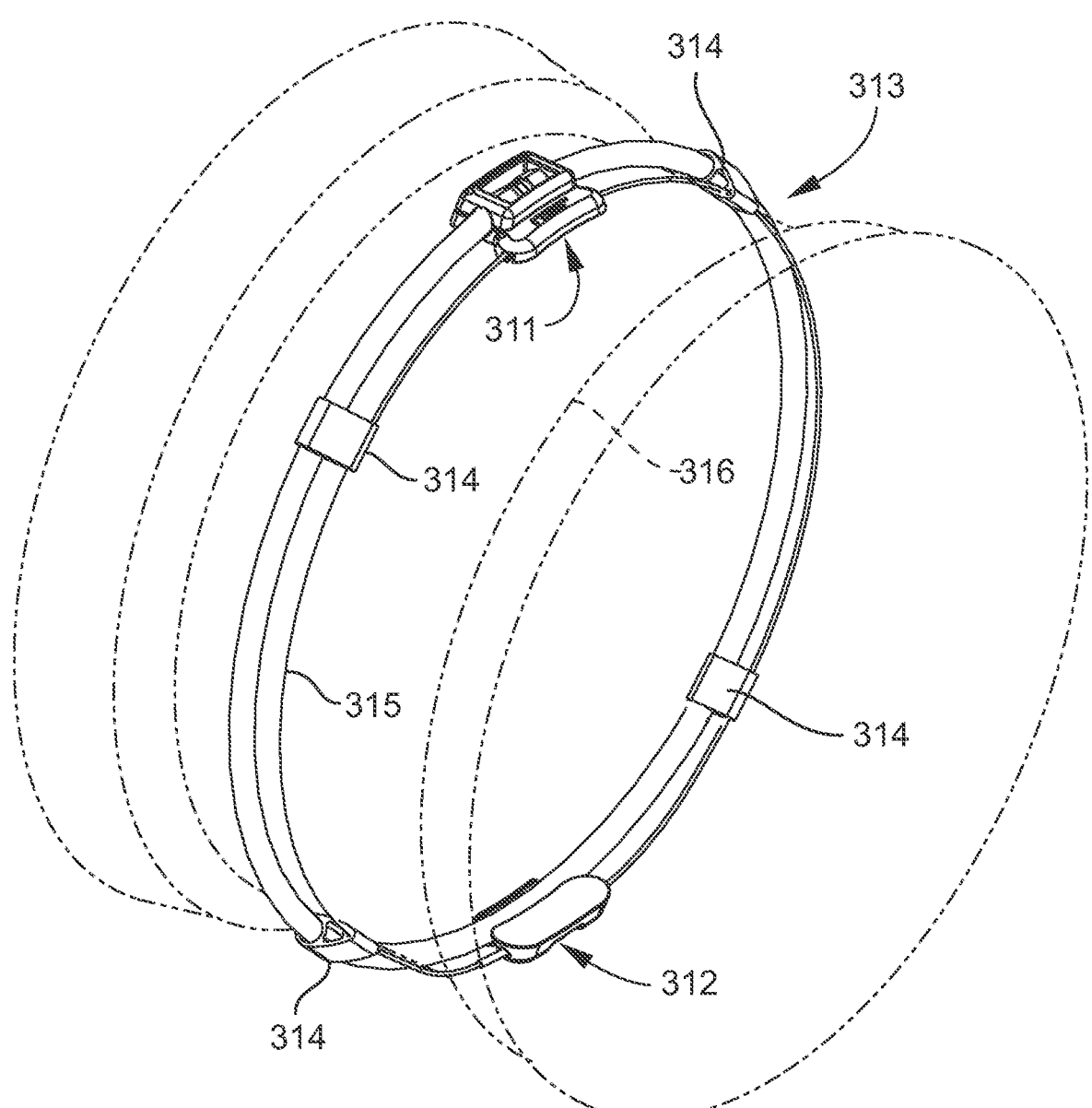
FIG. 24-26 illustrate an alternative embodiment of the exemplary combination vehicle tire sensor assembly and wheel balancer.
Figure 25:
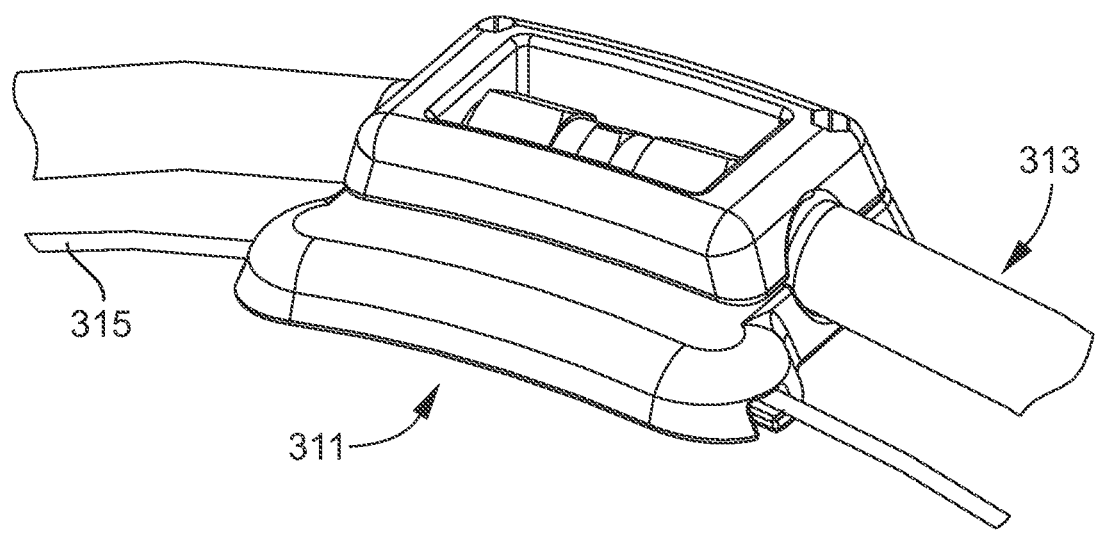
Figure 26:
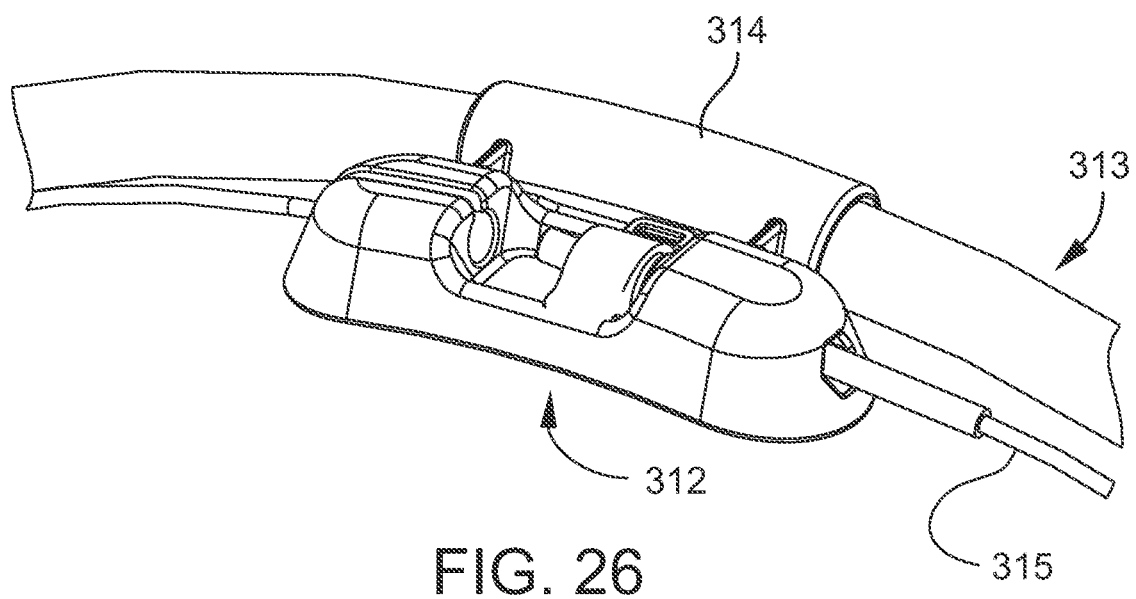

Referring to FIGS. 24, 25 and 26, in a further embodiment of the exemplary combination, the cable-mounted TPMS 311 and counterweight 312 may reside laterally adjacent (to the side of) an hoop-style in-tire wheel balancer 313. The wheel balancer 313 comprises a hollow annular tube containing a loose wheel balancing media, such as previously described. A number of circumferentially-spaced clips 314 are attached to the mounting cable 315 and wheel rim 316, and function to secure the annular tube of the balancer 313 inside the tire.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed is:

1. An in-tire vehicle tire sensor assembly adapted for residing inside a pneumatic tire mounted on a wheel rim of a motor vehicle, said vehicle sensor assembly comprising:
   a flexible mounting cable secured to said sensor assembly, and adapted for extending circumferentially within an annular space formed between the tire and wheel rim; and
   a counterweight secured to said mounting cable and adjustably spaced apart from said sensor assembly.

2. The in-tire vehicle sensor assembly according to claim 1, wherein said tire sensor assembly comprises a tire pressure monitoring system.

3. The in-tire vehicle sensor assembly according to claim 2, wherein said tire pressure monitoring system comprises a substantially hollow sensor housing.

4. The in-tire vehicle sensor assembly according to claim 3, wherein said sensor housing comprises a battery cavity.

5. The in-tire vehicle sensor assembly according to claim 4, and comprising a replaceable battery located within said battery cavity of said sensor housing.

6. The in-tire vehicle sensor assembly according to claim 5, wherein said sensor housing further comprises a removable threaded battery cap and O-ring adapted to cover and seal a top opening of said battery cavity.

7. The in-tire vehicle sensor assembly according to claim 5, wherein said battery comprises a rechargeable coin cell lithium battery.

8. The in-tire vehicle sensor assembly according to claim 1, wherein said flexible mounting cable has opposite ends and adjustably connects to said counterweight at said opposite ends.

9. The in-tire vehicle sensor assembly according to claim 1, wherein said counterweight is spaced 180-degrees from said sensor assembly.

10. An in-tire vehicle tire sensor assembly adapted for residing inside a pneumatic tire mounted on a wheel rim of a motor vehicle, said in-tire vehicle sensor assembly comprising:
   a flexible mounting cable secured to said sensor assembly, and adapted for extending circumferentially within an annular space formed between the tire and wheel rim;
   a coil spring configured for adjustably tensioning said mounting cable; and
   a counterweight secured to said mounting cable an adjustably spaced distance from said sensor assembly.

11. The in-tire vehicle sensor assembly according to claim 10, wherein said tire sensor assembly comprises a tire pressure monitoring system.

12. The in-tire vehicle sensor assembly according to claim 11, wherein said tire pressure monitoring system comprises a substantially hollow sensor housing.

13. The in-tire vehicle sensor assembly according to claim 12, wherein said sensor housing comprises a battery cavity.

14. The in-tire vehicle sensor assembly according to claim 13, and comprising a replaceable battery located within said battery cavity of said sensor housing.

15. The in-tire vehicle sensor assembly according to claim 14, wherein said sensor housing further comprises a removable threaded battery cap and O-ring adapted to cover and seal a top opening of said battery cavity.

16. The in-tire vehicle sensor assembly according to claim 14, wherein said battery comprises a rechargeable coin cell lithium battery.

17. The in-tire vehicle sensor assembly according to claim 10, wherein said flexible mounting cable has opposite ends and adjustably connects to said counterweight at said opposite ends.

18. The in-tire vehicle sensor assembly according to claim 10, wherein said counterweight is spaced 180-degrees from said sensor assembly.

\* \* \* \* \*